US009288274B2

(12) United States Patent
Felt

(10) Patent No.: US 9,288,274 B2
(45) Date of Patent: Mar. 15, 2016

(54) DETERMINING A COMMUNITY EMOTIONAL RESPONSE

(71) Applicant: CELLCO PARTNERSHIP, Basking Ridge, NJ (US)

(72) Inventor: Michelle Felt, Randolph, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/010,001

(22) Filed: Aug. 26, 2013

(65) Prior Publication Data
US 2015/0058416 A1   Feb. 26, 2015

(51) Int. Cl.
*G06F 15/16* (2006.01)
*H04L 29/08* (2006.01)

(52) U.S. Cl.
CPC ...................................... *H04L 67/22* (2013.01)

(58) Field of Classification Search
CPC ................................ G06Q 10/10; H04L 29/06
USPC .......................................................... 709/204
See application file for complete search history.

(56) References Cited

U.S. PATENT DOCUMENTS

| | | | | |
|---|---|---|---|---|
| 7,216,304 B1* | 5/2007 | Gourdol | ................ | G06F 9/4443 715/744 |
| 8,676,937 B2* | 3/2014 | Rapaport | ................ | H04L 51/32 709/219 |
| 2006/0129693 A1* | 6/2006 | LeCroy | ............. | H04L 29/06027 709/231 |
| 2009/0106697 A1* | 4/2009 | Ward | ...................... | G06Q 10/06 715/835 |
| 2009/0193344 A1* | 7/2009 | Smyers | .................. | G06Q 30/02 715/753 |
| 2010/0293508 A1* | 11/2010 | Hwang | ............... | G06F 3/04886 715/846 |
| 2011/0219071 A1* | 9/2011 | Vogel et al. | .................... | 709/204 |
| 2011/0264531 A1* | 10/2011 | Bhatia et al. | ................ | 705/14.66 |
| 2012/0158504 A1* | 6/2012 | Kumar | ............... | G06Q 30/0255 705/14.53 |
| 2013/0144937 A1 | 6/2013 | Lee | | |
| 2013/0159884 A1* | 6/2013 | Isozu | ...................... | H04W 4/06 715/753 |
| 2013/0191458 A1* | 7/2013 | Krishnan et al. | .............. | 709/204 |
| 2014/0004489 A1* | 1/2014 | Kim | ........................ | G09B 19/00 434/236 |

FOREIGN PATENT DOCUMENTS

GB   WO 2007035412 A2 *  3/2007  ............. G06Q 30/02

OTHER PUBLICATIONS

"Samsung Seeks Patents on Sharing User Emotion on a Social Network, Fragrant Mobile Phone," available at http://www.ipwatchdog.com/2013/06/26/samsung-seeks-patents-on-sharing-user-emotion-on-a-social-network-fragrant-mobile-phone/id=41625/, last visited Jun. 27, 2013.

* cited by examiner

*Primary Examiner* — Vivek Srivastava
*Assistant Examiner* — Atta Khan

(57) ABSTRACT

Systems and methods for determining a community emotional response are disclosed. In some implementations, a plurality of user feedback items for an online content are received. The user feedback items describe reactions of users to the online content. A user's emotional response associated with each of the plurality of user feedback items is determined. The emotional responses are aggregated to determine a community emotional response to the online content. A signal is transmitted for displaying, on a display unit and in association with the online content, of a visual indication of the community emotional response to the online content.

20 Claims, 13 Drawing Sheets

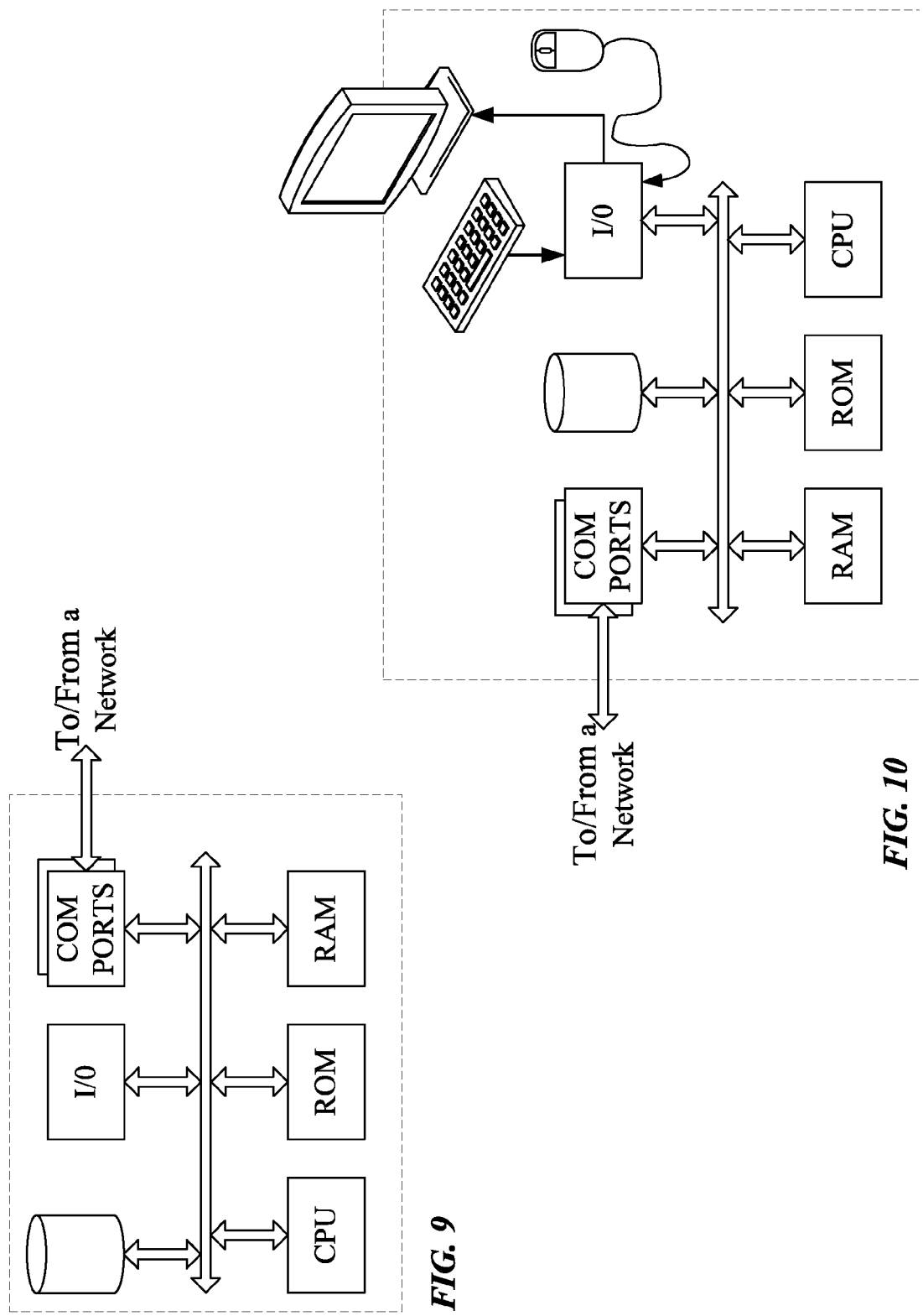

DETERMINING A COMMUNITY EMOTIONAL RESPONSE

BACKGROUND

When viewing an event, for example, a sports game, a weather event, or a children's spelling bee, in person, human beings sometimes have emotional responses and visually or orally share their emotional responses with others. As a result, a viewer present at the event is able to determine the community emotional response to the event. For example, if the Red Sox hit a homerun during a game in Boston, a viewer will likely determine that the audience is joyful, happy, or excited based on the audio and visual reactions of the people at the event.

In some cases, users learn about events by reading articles in an online news source. Online news sources allow users to learn facts about events (e.g., the Red Sox hit a home run) quickly. However, in order to determine the community emotional response to the event, a user may need to read multiple comments on the article. The comments may be available in the online news source. Alternatively or additionally, the user may access a social networking service (e.g., Facebook® or Twitter®) to read multiple posts related to the article or the event. Determining the community emotional response to the article or the event based on the above methods may not be very efficient for a user who may wish to learn the community emotional response quickly and/or focus on articles to which the community has a certain emotional response. For example, a user who is trying to become happier or more optimistic may wish to read articles that have a happy or positive community emotional response and avoid articles with a sad or negative community emotional response. As the foregoing illustrates, a new approach for determining and presenting a community emotional response to an online content may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 9 is a simplified functional block diagram of a computer that may be configured to function as the client computing device, the server, or the data repository shown in FIG. 1; and FIG. 10 is a simplified functional block diagram of a personal computer or other work station or terminal device.

DETAILED DESCRIPTION

Figure 1:
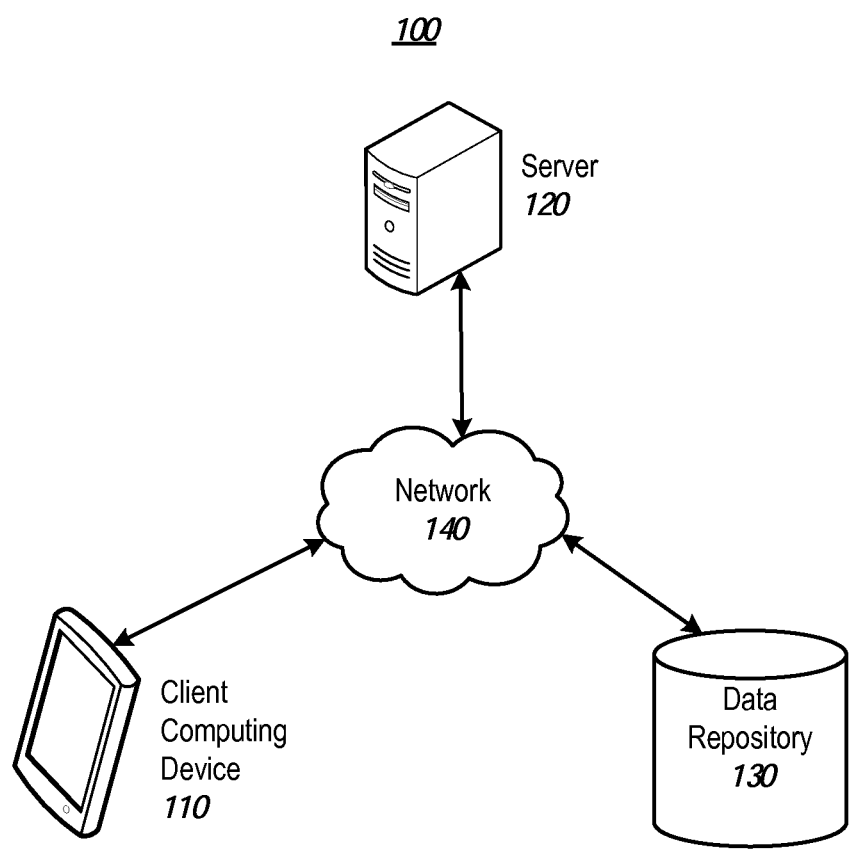
FIG. 1 illustrates an exemplary system for determining a community emotional response.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for determining and presenting a community emotional response to an online content. The online content may be, for instance, a webpage, an article, or a mobile device application. Webpages or mobile device applications related to specific sports teams or political views (e.g., the National Rifle Association's webpage or mobile device application) are likely to elicit strong emotional responses. Similarly, articles related to sports, politics, or crime are likely to elicit strong emotional responses.

According to some implementations, a server receives multiple user feedback items, which may include either or both multiple types of feedback from a single user or the same type of feedback from multiple users, for online content. The server determines that at least a portion of the multiple user feedback items are associated with a user's emotional response. The multiple user feedback items may include, for example, comments on an article, a webpage that allows commenting, or social networking posts. The social networking posts are posts that are visible to the public and are provided to the server in an anonymized form. The server may determine the associated emotional responses based on the text of the comments. For example, a social networking post, "I am happy that the Red Sox beat the Yankees," implies an associated user's emotional response of happiness due to the presence of the word "happy," in the post.

In some examples, upon presentation of the online content (e.g., in a web browser), the user could be prompted to select his/her emotional response from a set of options. For instance, the user could be asked for his/her emotional response and then allowed to select, "happy," "sad," "excited," or "angry" as the emotional response via a radio button interface. After receiving the selection of the emotional response, the user may be presented with a scroll bar and a scroll thumb (or any other slider) for indicating an intensity level of the emotional response. The intensity level may be stored in conjunction with the emotional response. Advantageously, in the approach described above, the intensity level of the emotional response is stored, so that the server may distinguish between stronger and weaker emotional responses.

The server determines, based on the multiple user feedback items and the emotional responses, a community emotional response to the online content. The community emotional response can correspond to the most popular user emotional response or a user emotional response exhibited by at least a threshold number or threshold proportion (e.g., 30%, 40%, or 50%) of users. Alternatively, the community emotional response can be determined based on a combination of at least two user emotional responses, where each of the emotional responses is associated with at least a threshold number or a threshold proportion (e.g., 25% or 35%) of the multiple user feedback items. For example, if an article has at least the threshold proportion of emotional responses indicating "anticipation" and at least the threshold proportion of emotional responses indicating "joy," the article may be associated with the combined emotions of "anticipation" and "joy," which is the emotion of "optimism." In some examples, if the emotional responses are associated with intensity levels, the intensity levels may also be taken into account. For example, if the most popular emotional response to an online content is "anger" at a low intensity level, the community emotional response may be a low degree of anger or "annoyance." If the most popular emotional response to an online content is "anger" at a high intensity level, the community emotional response may be a high degree of anger or "rage."

The server provides a visual indication of the community emotional response to the online content. The visual indication may include an icon (e.g., an emoticon), a color code, and/or a texture pattern corresponding to the community emotional response. For example, the visual indication may be provided on a homepage or a mobile device application of an online news source. In some implementations, happy articles may be highlighted in blue and sad articles may be highlighted in red. Alternatively or in addition, an emoticon or other visual symbol corresponding to the community emotional response to an article may be placed adjacent to the title of the article.

FIG. 1 illustrates an exemplary system 100 for determining a community emotional response. As shown, the system 100 includes a client computing device 110, a server 120, and a data repository 130. The client computing device 110, the server 120, and the data repository 130 communicate with one another via a network 140. In some examples, the data repository 130 is a component of the computer configured as the server 120, and the server 120 does not use the network 140 to communicate with the data repository 130. The network 140 may include a cellular network, the Internet, an intranet, a local area network, a wide area network, a wired network, a wireless network, or a virtual private network (VPN). While only one data repository 130, server 120, and client computing device 110 are illustrated, the subject technology may be implemented in conjunction with any number of data repositories 130 or servers 120, which can support determining a community emotional response in conjunction with any number of client computing devices 110. In some aspects, a single machine may implement the functions of two or more of the data repository 130, the server 120, or the client computing device 110. In some examples, a single device performs the functions of all three of the client computing device 110, the server 120, and the data repository 130. The single device may perform these functions without accessing the network 140.

The data repository 130 stores online content (e.g., webpages, mobile device applications, etc.), users' emotional responses to the online content, and a community emotional response to the online content. The data repository 130 may be implemented as a database or any other data store. One example of the data repository 130 is described in more detail in conjunction with FIG. 4 below.

The server 120 includes one or more modules for determining a community emotional response to online content and presenting the community emotional response at a client computing device 110. The one or more modules can be implemented in software. The one or more modules can include data, code, or a combination of data and code. The server 120 may be implemented as a single machine with a single processor, a multi-processor machine, or a server farm including multiple machines with multiple processors. One example of the server 120 is described in more detail in conjunction with FIG. 3 below.

The client computing device 110 may be a mobile phone, a personal digital assistant (PDA), a tablet computer, a netbook, a laptop computer, a desktop computer, a television with one or more processors embedded therein or coupled thereto, etc. The client computing device 110 may include one or more user input/output elements, for example, a display, a touch screen, a speaker, a microphone, a keyboard, or a mouse. The client computing device 110 may include application(s) and/or a web browser for accessing online content. One example of the client computing device 110 is described in more detail in conjunction with FIG. 2 below.

According to some examples, the server 120 determines a community emotional response to an online content residing in the data repository 130 based on users' emotional responses to the online content at the data repository 130. For example, the community emotional response may correspond to a most popular emotional response from among the users' emotional responses. The server 120 signals for presentation of the community emotional response at the client computing device 130 in conjunction with the online content. For example, if the online content is a webpage, the webpage may be color coded in a web browser window, with the color of the color code corresponding to the emotional response. In one instance, the community emotional response is "joy" and the color code is yellow. Alternatively, a texture pattern (e.g., dots, vertical lines, horizontal lines, or diagonal lines) may be used in place of the color code. The texture pattern may be applied across the white space that does not include text or image(s) of a page, so as not to interfere with the user's ability to read or view information on the page. For example, the white space may be modified to include dots, horizontal lines, vertical lines, or diagonal lines, without modifying image(s) on the page or the part of the page covered with text. The texture pattern may be advantageous over the color code, as the texture pattern may be visible to colorblind users. However, the color code may be advantageous over the texture pattern as the color code may be easier to detect by non-colorblind users.

A user may opt-in or opt-out of viewing the community emotional response via color code(s) or texture pattern(s). As a result, only users interested in community emotional response information are provided this information. In some aspects, a user is able to select (e.g., via a settings menu on a mobile device or a web browser) whether the user prefers color codes or texture patterns to indicate the community emotional response. The preference for viewing the community emotional response and for color coded or textured information may be stored locally at the mobile device or in the web browser and the displayed content may be adjusted (e.g., a color code or texture pattern may be applied) locally at the mobile device or at the web browser after the content is received from the server. Alternatively, the server may check the preference before delivering the content, and the content may be adjusted at the server prior to delivery to the mobile device or the web browser.

Figure 2:
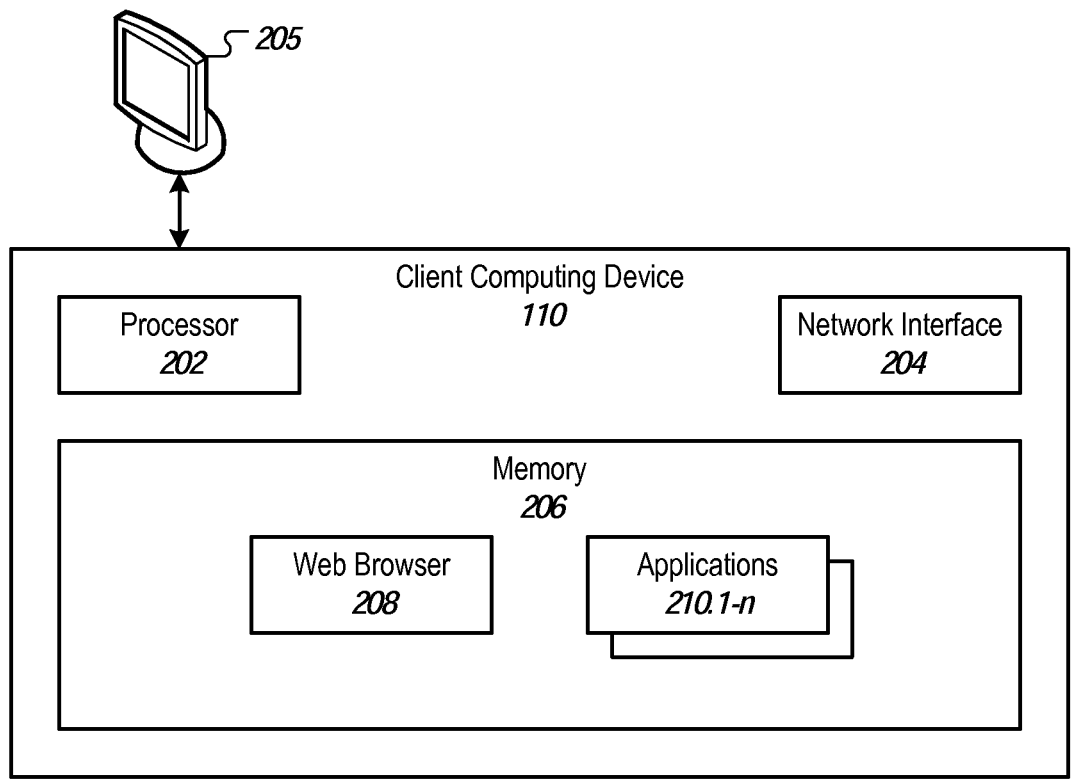
FIG. 2 illustrates the client computing device of FIG. 1 in greater detail.

FIG. 2 illustrates the client computing device 110 of FIG. 1 in greater detail. As shown, the client computing device 110 includes a processor 202, a network interface 204, and a memory 206. While a single processor 202 is illustrated, the client computing device may have multiple processors. The processor 202 is configured to execute computer instructions that are stored in a computer-readable medium, for example, the memory 206. The network interface 204 is configured to allow the client computing device 110 to transmit and receive data in a network, e.g., network 140 of FIG. 1. The network interface 204 may include one or more network interface cards (NICs). The memory 206 stores data or instructions. The memory 206 may be one or more of a cache unit, a storage unit, an internal memory unit (e.g., a hard disk internal to a computing device), or an external memory unit (e.g., a removable universal serial bus, compact disk, or floppy disk memory). As illustrated, the memory 206 includes a web browser 208 and applications 210.1-n.

As illustrated, the client computing device 110 is coupled, via a wired or wireless connection, with a display unit 205. The display unit 205 is configured to display information provided for display through the client computing device 110, for example views corresponding to webpages in the web browser 208 or views corresponding to the applications 210.1-n. The display unit 205 may include, for example, one or more screens or one or more projectors. While the display unit 205 is illustrated as residing externally from the client computing device 200, the display unit 205 may be a component within the client computing device 110.

The web browser 208 is configured to display online content, including web pages and web applications. An online content may be associated with a community emotional response. The web browser 208 may include a toggle button for enabling display of the community emotional response. If display of the community emotional response is enabled, the community emotional response may be presented as a background color (e.g., yellow) for a webpage or a web application or an icon (e.g., a smiley face) presented adjacent to the webpage or web application. Alternatively, the web browser 208 may include a settings menu, accessible via a menu bar of the web browser, for enabling or disabling, as well as for specifying, presentation of the community emotional response to online content displayed via the web browser 208.

Each application among the applications 210.1-n may correspond to an online content item and/or include online content(s) within the application. For example, a social networking application may be a content item itself and may include content items (e.g., photographs, articles, etc.) within the social networking application. When community emotional response presentation is enabled, for example, within the settings or control panel of the client computing device 110, application(s) or content within application(s) corresponding to online content can be color coded, associated with a texture pattern, or include icons corresponding to the community emotional response. The community emotional response presentation may be enabled or disabled by the user of the client computing device 110 by accessing the control panel or settings of the client computing device 110 and selecting or deselecting a toggle button, or similar interface icon, for enabling community emotional response presentation. Illustrations of displays presenting community emotional responses are provided in FIG. 7 and FIGS. 8A-8F and are described in greater detail below.

Figure 3:
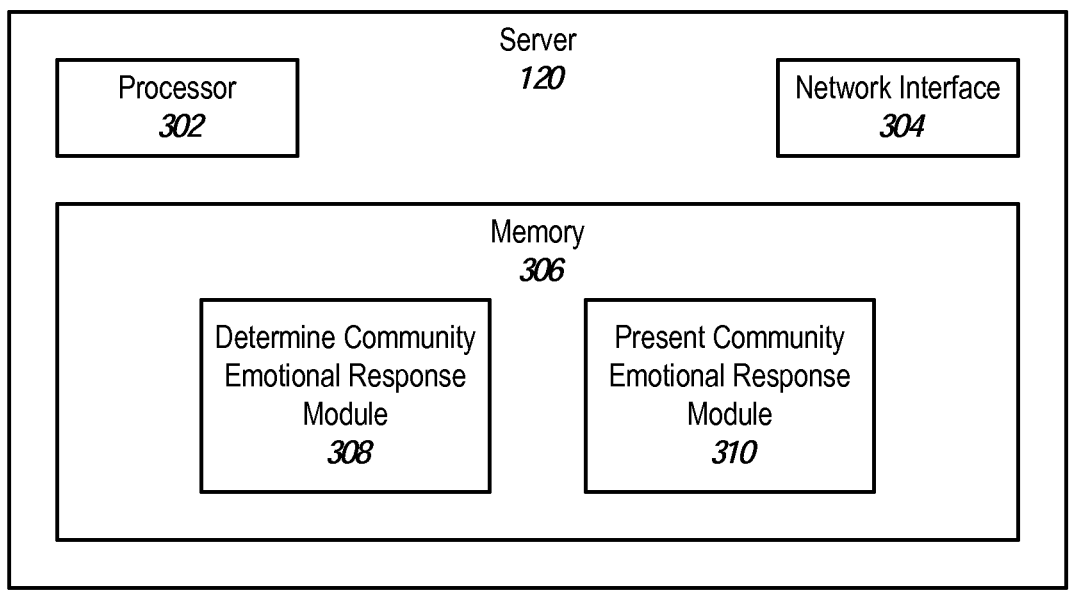
FIG. 3 illustrates the server of FIG. 1 in greater detail.

FIG. 3 illustrates the server 120 of FIG. 1 in greater detail. As shown, the server 120 includes a processor 302, a network interface 304, and a memory 306. While a single processor 302 is illustrated, the server 120 may have multiple processors. The processor 302 is configured to execute computer instructions that are stored in a computer-readable medium, for example, the memory 306. The network interface 304 is configured to allow the server 120 to transmit and receive data in a network, e.g., network 140 of FIG. 1. The network interface 304 may include one or more network interface cards (NICs). The memory 306 stores data or instructions. The memory 306 may be one or more of a cache unit, a storage unit, an internal memory unit (e.g., a hard disk internal to a computing device), or an external memory unit (e.g., a removable universal serial bus, compact disk, or floppy disk memory). As illustrated, the memory 306 includes a determine community emotional response module 308 and a present community emotional response module 310.

The determine community emotional response module 308, when executed, causes the processor 302 to receive multiple user feedback items (e.g., comments or social networking posts) for an online content (e.g., a webpage). The user feedback items describe reactions of users to the online content. The determine community emotional response module 308 causes the processor 302 to determine a user's emotional response (e.g., anger) associated with each of the multiple user feedback items. The determine community emotional response module 308 causes the processor 302 to aggregate the emotional responses to determine a community emotional response to the online content. The operation of the processor 302 when executing the determine community emotional response module 308 is described in more detail in conjunction with FIG. 5.

The present community emotional response module 310, when executed, causes the processor 302 to transmit, to the client computing device 110, a signal for displaying, on the display unit 205 of the client computing device 210 and in association with the online content, a visual indication of the community emotional response to the online content. The operation of the processor 302 when executing the present community emotional response module 310 is described in more detail in conjunction with FIG. 5.

Figure 4:
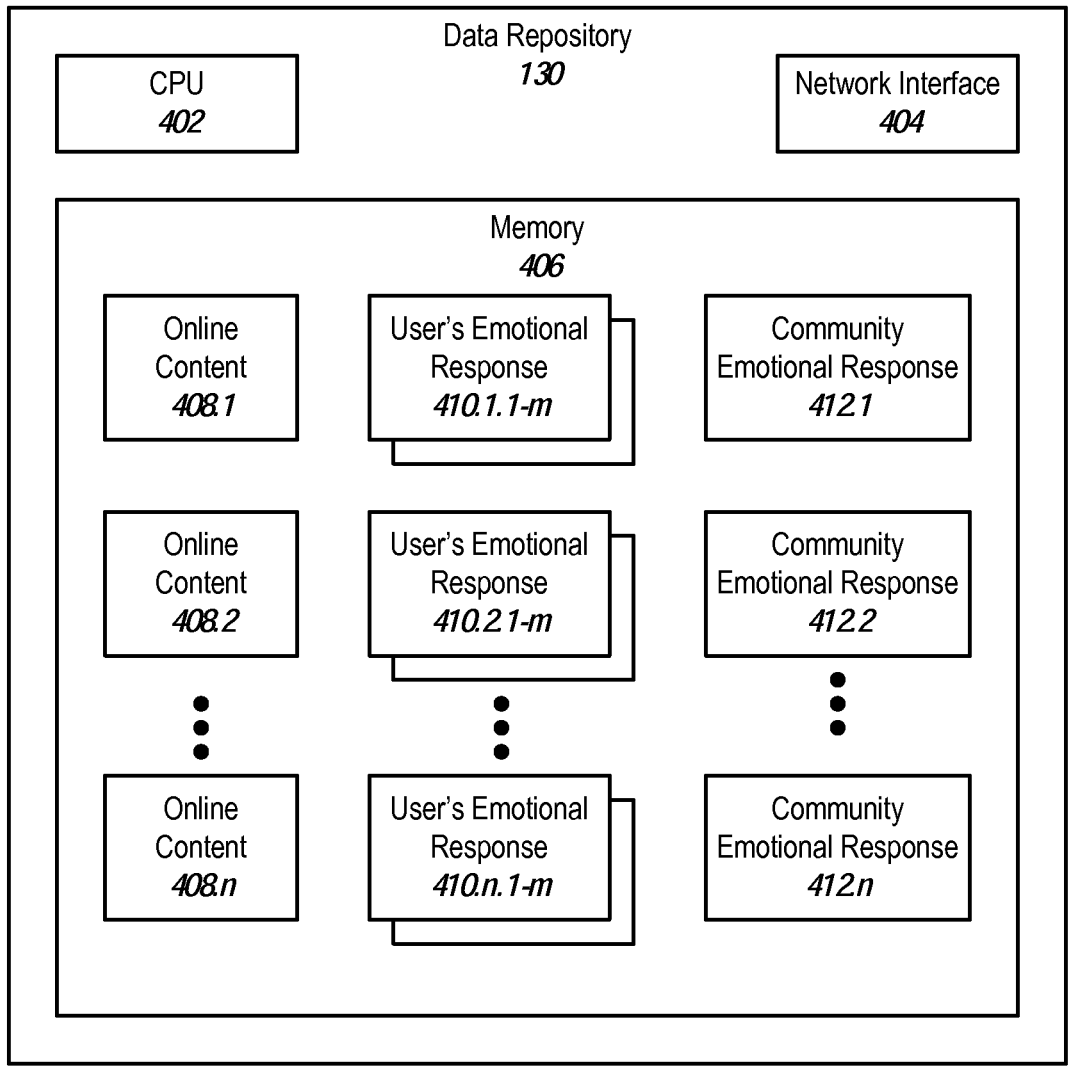
FIG. 4 illustrates the data repository of FIG. 1 in greater detail.

FIG. 4 illustrates the data repository 130 of FIG. 1 in greater detail. As shown, the data repository 130 includes a processor 402, a network interface 404, and a memory 406. While a single processor 402 is illustrated, the data repository 130 may have multiple processors. The processor 402 is configured to execute computer instructions that are stored in a computer-readable medium, for example, the memory 406. The network interface 404 is configured to allow the data repository 130 to transmit and receive data in a network, e.g., network 140 of FIG. 1. The network interface 404 may include one or more network interface cards (NICs). The memory 406 stores data or instructions. The memory 406 may be one or more of a cache unit, a storage unit, an internal memory unit (e.g., a hard disk internal to a computing device), or an external memory unit (e.g., a removable universal serial bus, compact disk, or floppy disk memory). As illustrated, the memory 406 includes online content 408.1-n. Each online content 408.k, where k is a number between 1 and n, is associated with the emotional response of different users 410.k.1-m and a community emotional response 412.k.

Each online content 408.k may correspond to any online content, for example, a webpage, an online article, a mobile device application, or a web application. Users may provide one or more types of user feedback items, for example, comments or social networking posts, related to the online content 408.k. For example, a user may publicly share, via a social networking service, a newspaper article about a politician winning an election and write a comment, "I am disgusted and angered that the citizens of the jurisdiction voted for the politician," in association with the sharing of the article. Based on a natural language filtering and/or a textual analysis of this comment, the user's emotional response 410.k.j may correspond to "disgust" and "anger." Alternatively, the user may actively provide his/her emotional response, for example, by selecting a radio button corresponding to his/her emotional response or by moving a scroll thumb on a scroll bar to a position corresponding to his/her emotional response, as described in greater detail below. Based on the primary emotion graph, discussed in detail below, the emotions of "disgust" and "anger" may be combined into the emotion of "contempt," which may also correspond to the user's emotional response 410.k.h. After multiple of each user's emotional response 410.k.1-n for online content 408.k are received, the community emotional response 412.k for the online content 408.k may be determined based on the users' emotional responses 410.k.1-n. The community emotional response 412.k may correspond to, for example, a most common or an average emotional response among the users' emotional responses 410.k.1-n.

According to some implementations, particular users' emotional responses may be weighted. For example, a user who indicates that he/she is angry about many different content items or has diametrically opposed emotions related to many different content items and rarely indicates other emotions associated with content items may be weighted less than a user who indicates different emotional responses for different content items. In some examples, emotional indications by social contacts (e.g., in a social networking contacts) of the user accessing the content or of users having similar viewpoints (e.g., political viewpoints, hobbies, or interests) may be weighted more heavily than emotional indications by others. For example, a user of a mobile device displaying community emotional responses may be a political liberal interested in athletic activities, coffee, and economic policy. The information that the user is a political liberal interested in athletic activities, coffee, and economic policy may be stored at the mobile device or within a social networking service. Based on this information, emotional responses by users who are also political liberals, interested in athletic activities, interested in coffee, or interested in economic policy may be weighted more highly than those of other users. In some examples, emotional responses of users may be weighted based on their sources. For example, comments from a social networking service may be weighted higher than comments associated with an article on a webpage of a news source or comments entered in response to a direct prompt to a user to provide his/her emotional response, as users who are interested in and moved by content may be motivated to create social network comments related to the content.

Figure 5:
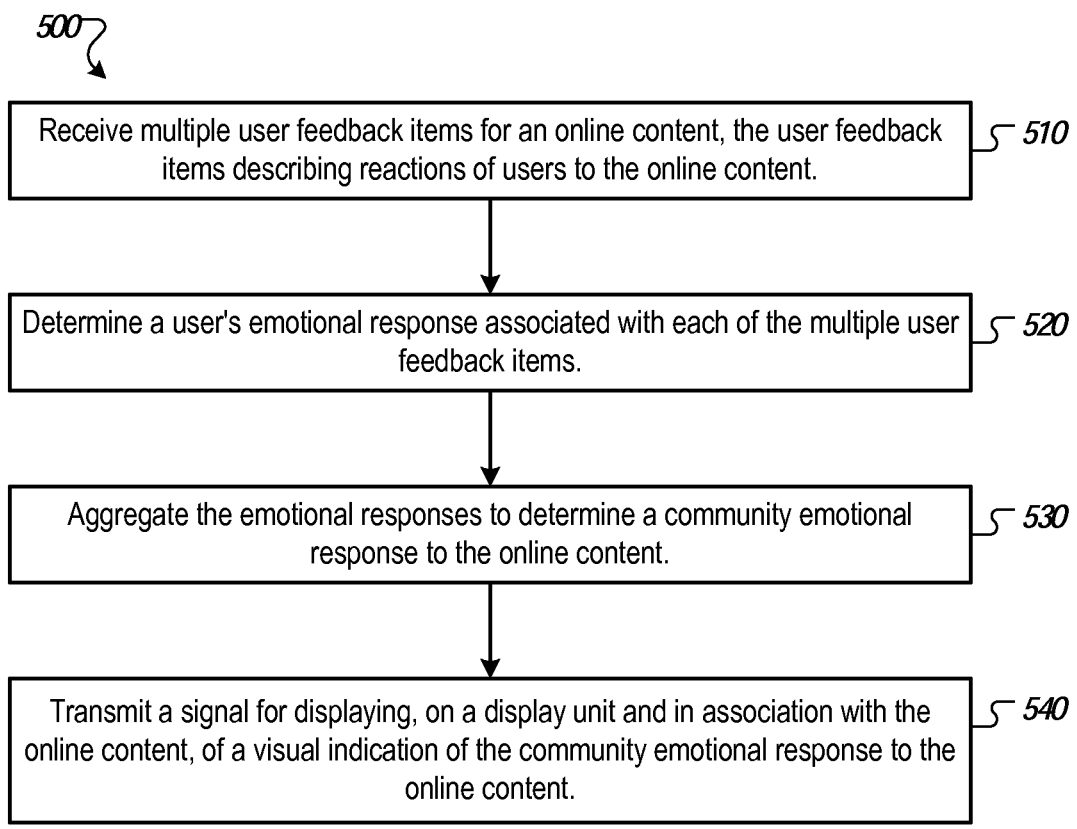
FIG. 5 illustrates an exemplary process for determining a community emotional response.

FIG. 5 illustrates a flow chart of an exemplary process 500 for determining a community emotional response.

The process 500 begins at step 510, where a server (e.g., server 120, via execution of the determine community emotional response module 308 by the processor 302) receives multiple user feedback items for an online content (e.g., online content 408.k). The user feedback items describe reactions of users to the online content. The user feedback items may include comments or social networking posts regarding the online content. The comments may be comments about a newspaper article or an item being sold by an online store. The user feedback items may also include direct emotional ratings regarding the online content.

In some implementations, the server may receive the multiple user feedback items by providing the online content to a client computing device (e.g., client computing device 110) for presentation to a user. The server may receive, from the client computing device, a user selection of an emotional response to the online content. The user selection of the emotional response may be selected from a set of emotional response options. For example, the set of emotional response options may include: "happy," "sad," "angry," or "excited." The server may receive, from the client computing device, an indication of an intensity level of the user selected emotional response. The user may indicate the intensity level by moving a scroll thumb along a scroll bar or by typing into a input box a number (e.g., a number between 0 and 10) indicating the intensity level. Alternatively, any slider may be used in place of the scroll bar and the scroll thumb.

At step 520, the server determines a user's emotional response associated with each of the multiple user feedback items. For example, the user's emotional response may be determined based on the text of the comments or the social networking posts displayed in a comment section of the online content or associated with the online content. In some examples, a newspaper article may have a "comments" section at the bottom of the article, and a comment about the article may include the text, "I am afraid and surprised." Based on this comment, the user's emotional response "fear" and "surprise" may be determined. In addition, the user's emotional response of "awe," which is the combination of "fear" and "surprise" as discussed herein in conjunction with FIG. 6, may be determined. In some cases, a comment may indicate conflicting emotions, for example, "I am both surprised and not surprised." In these cases, the comment may be ignored or the user's emotional response may not be determined, as the user's emotional response is not certain from the comment. Alternatively, machine learning and/or artificial intelligence may be used to determine the user's emotional response based on the stated conflicting emotions.

At step 530, the server aggregates the emotional responses to determine a community emotional response to the online content. In some cases, the server may determine at least a threshold number, for example, two, ten, twenty, one hundred, etc., of users' emotional responses among the aggregated emotional responses, where each of the users' emotional responses is associated with at least a threshold number or percent (e.g., 20% or 30% of all of the responses) of user feedback, and generate the community emotional response based on a combination of the user's emotional responses. The threshold number may be determined by a server, based on a total number of users providing emotional responses to various content items or based on an average number of users providing emotional responses and a standard deviation of this measurement. In some examples, a predetermined percentage (e.g., 90%) of content for which there are user emotional responses have associated community emotional responses. For example, the combination may correspond to a combination of emotional responses as illustrated in the primary emotion graph of FIG. 6. Alternatively, the community emotional response may correspond to a most common emotional response among the aggregated emotional responses. In some implementations, the community emotional response is determined based on an aggregation of multiple user selected emotional responses and multiple associated intensity levels.

At step 540, the server, for example, by executing the present community emotional response module 310 using the processor 302, transmits a signal for displaying, on a display unit of a client computing device and in association with the online content, of a visual indication of the community emotional response to the online content. The visual indication of the community emotional response may include color coding or assigning a texture pattern to the online content based on the community emotional response. For example, if the community emotional response is "anger," the online content may be color coded red. The visual indication of the community emotional response may include an icon (e.g., an emoticon) corresponding to the community emotional response. In some implementations, other information about the online content may also be visually indicated. For example, the server may determine, based on the multiple user feedback items, a popularity level of the online content and provide a visual indication of the popularity level for the online content. After step 540, the process 500 ends.

Figure 6:
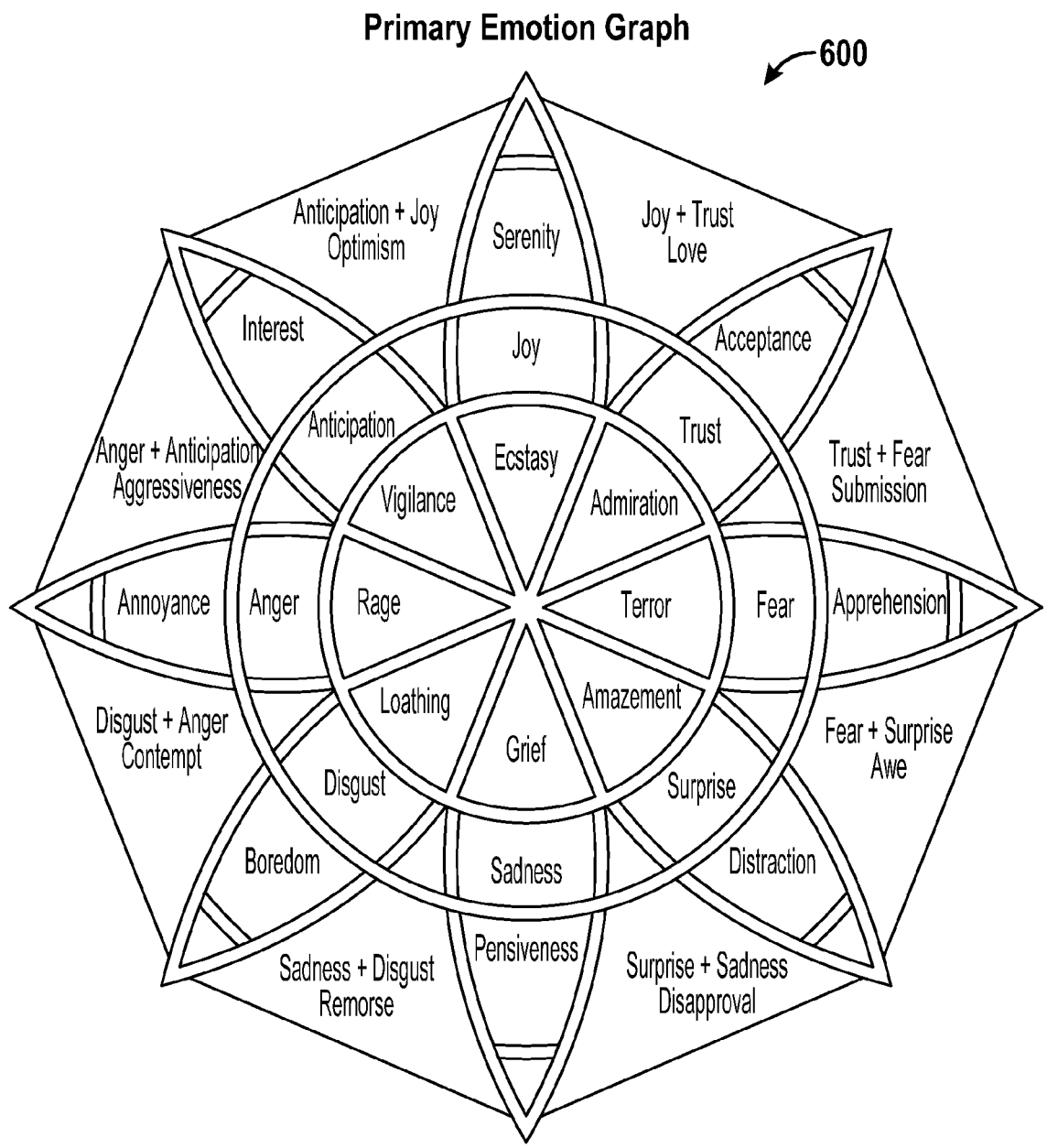
FIG. 6 illustrates an exemplary primary emotion graph that may be used in conjunction with some implementations.

FIG. 6 illustrates an exemplary primary emotion graph 600 that may be used in conjunction with some implementations. The primary emotion graph 600 illustrates degrees of emotions and combinations of emotions, with stronger degrees of emotions being presented closer to the center of the graph 600. For example, "serenity" is a weak form of "joy" and "ecstasy" is a strong form of "joy." "Acceptance" is a weak form of "trust" and "admiration" is a strong form of "trust." "Apprehension" is a weak form of "fear" and "terror" is a strong form of "fear." "Distraction" is a weak form of "surprise" and "amazement" is a strong form of "surprise." "Pensiveness" is a weak form of "sadness" and "grief" is a strong form of "sadness." "Boredom" is a weak form of "disgust" and "loathing" is a strong form of "disgust." "Annoyance" is a weak form of "anger" and "rage" is a strong form of "anger." "Interest" is a weak form of "anticipation" and "vigilance" is a strong form of "anticipation." As described herein, if a user indicates an emotion (e.g., "surprise") and an intensity level for the emotion (e.g. "weak"), the corresponding complete emotion (e.g., "distraction") can be determined based on the primary emotion graph 600. For the community emotional response, an average intensity level for a specific emotional response can be calculated and applied to the community emotional response. For example, if, for specified online content, the average intensity level of "trust" is "strong," the community emotional response may be "admiration."

The primary emotion graph 600 of FIG. 6 also illustrates combined emotions. For example, the combination of "joy" and "trust" is "love." The combination of "trust" and "fear" is "submission." The combination of "fear" and "surprise" is "awe." The combination of "surprise" and "sadness" is "disapproval." The combination of "sadness" and "disgust" is "remorse." The combination of "disgust" and "anger" is "contempt." The combination of "anger" and "anticipation" is "aggressiveness." The combination of "anticipation" and "joy" is "optimism." A user's emotional response that includes two emotions may be combined into a single emotion. For example, a comment, "I am joyful that the politician won the election and I anticipate great leadership by the politician," may be determined to include the user's emotional responses of "joy" and "anticipation," which may be combined, according to the primary emotion graph 600, to result in the user's emotional response of "optimism." Similarly, if at least a threshold number or threshold proportion of users indicate that they are feeling a first emotion, for example, "sadness" about a content item, and at least threshold number or threshold proportion of users indicate that they are feeling a second emotion, for example, "disgust," about the content item, the first emotion and the second emotion may be part of the community emotional response, or the first emotion and the second emotion may be combined according to the primary emotion graph 600 to determine the community emotional response. For example, "sadness" and "disgust" may be combined to yield "remorse." In some cases, a comment may include a statement of an emotional of one or more other persons, for example, "My friend Bob is happy that the candidate won the election," or "Many New Yorkers are distraught that the Yankees lost the game against the Red Sox." In these cases, the emotions expressed (e.g., of the friend Bob or of the New Yorkers) may be factored into the community emotional response in the same manner as the emotions of the author of the comment, as the author believes at least one person (e.g., Bob or at least one New Yorker) to hold those emotions.

Figure 7:
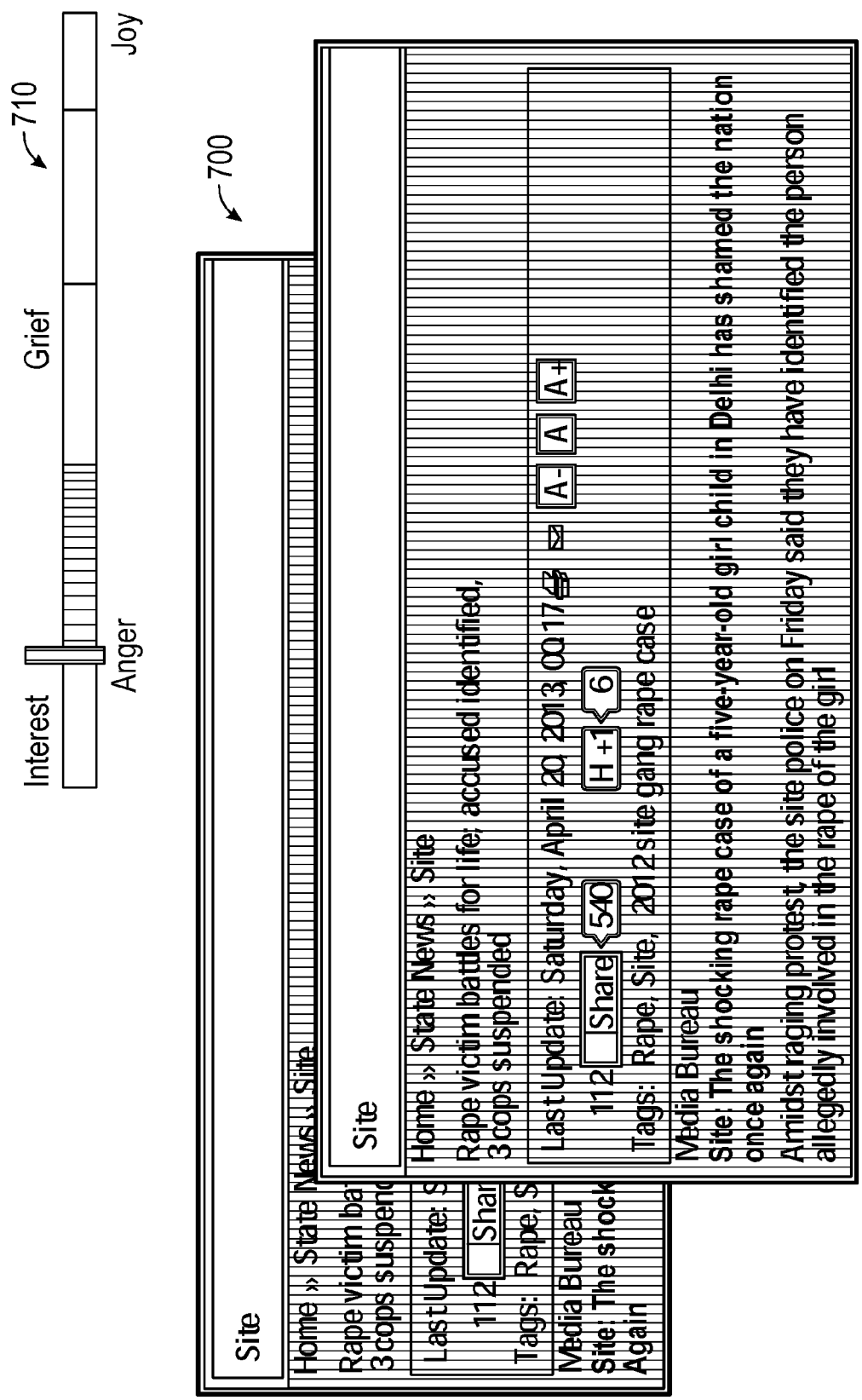
FIG. 7 illustrates an exemplary article presented according to some implementations.

FIG. 7 illustrates an exemplary article 700 presented according to some implementations. As shown, the article has a shaded or colored background with a color corresponding to the emotion of anger as shown in the shading/color association line 710. The emotion of anger may be the community emotional response to the article 700 as determined, for example, based on comments or social networking posts related to the article 700.

FIGS. 8A-8F illustrate exemplary interfaces that may be presented at the client computing device of FIG. 1 according to some implementations.

Figure 8A:
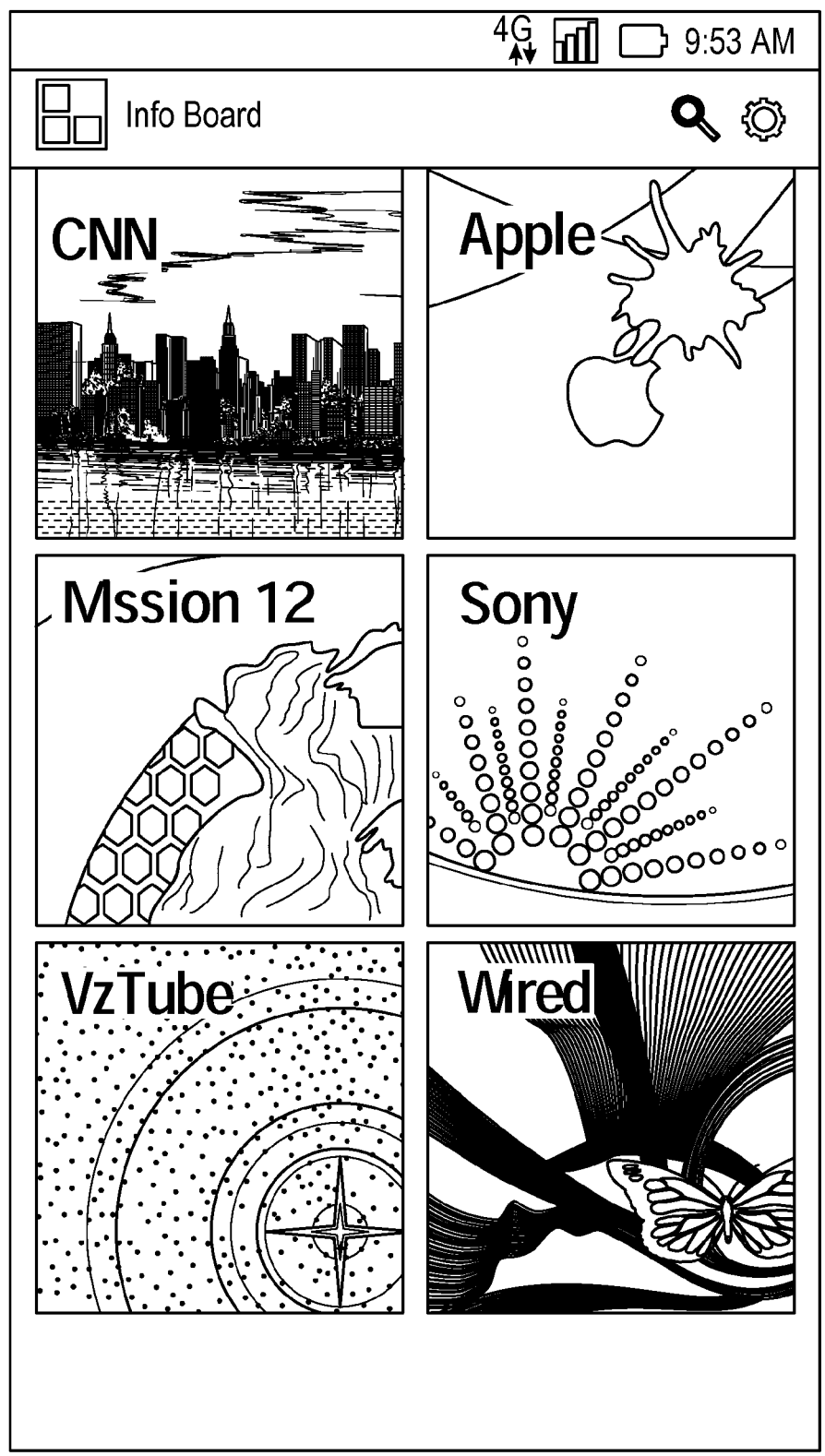
FIGS. 8A-8F illustrate exemplary interfaces that may be presented at the client computing device of FIG. 1 according to some implementations.

The interface of FIG. 8A may be presented, for example, at a client computing device such as a mobile device. The interface of FIG. 8A includes icons for "CNN," "Apple," "Mission 12," "Sony," "VzTube," and "Wired." Each of the icons may correspond to a content item, which may be, for example, a webpage, a web application, or a mobile device application. As shown, the "Apple" icon has a blob, indicating that the community emotional response for the content item associated with the "Apple" icon is engaging. The "Mission 12" icon has a fire, indicating that the community emotional response for the content item associated with the "Mission 12" icon is exciting. The "Wired" icon has a butterfly, indicating that the community emotional response for the content item associated with the "Wired" icon is social, which may mean that the "Wired" icon is associated with content that is associated with at least a threshold number (e.g., 100 or 500) of comments in a social networking comments. The user may be able to access a legend for enabling, disabling, or modifying icon(s) for indicating community emotional response(s) via a settings tool of a web browser or mobile device.

Figure 8B:
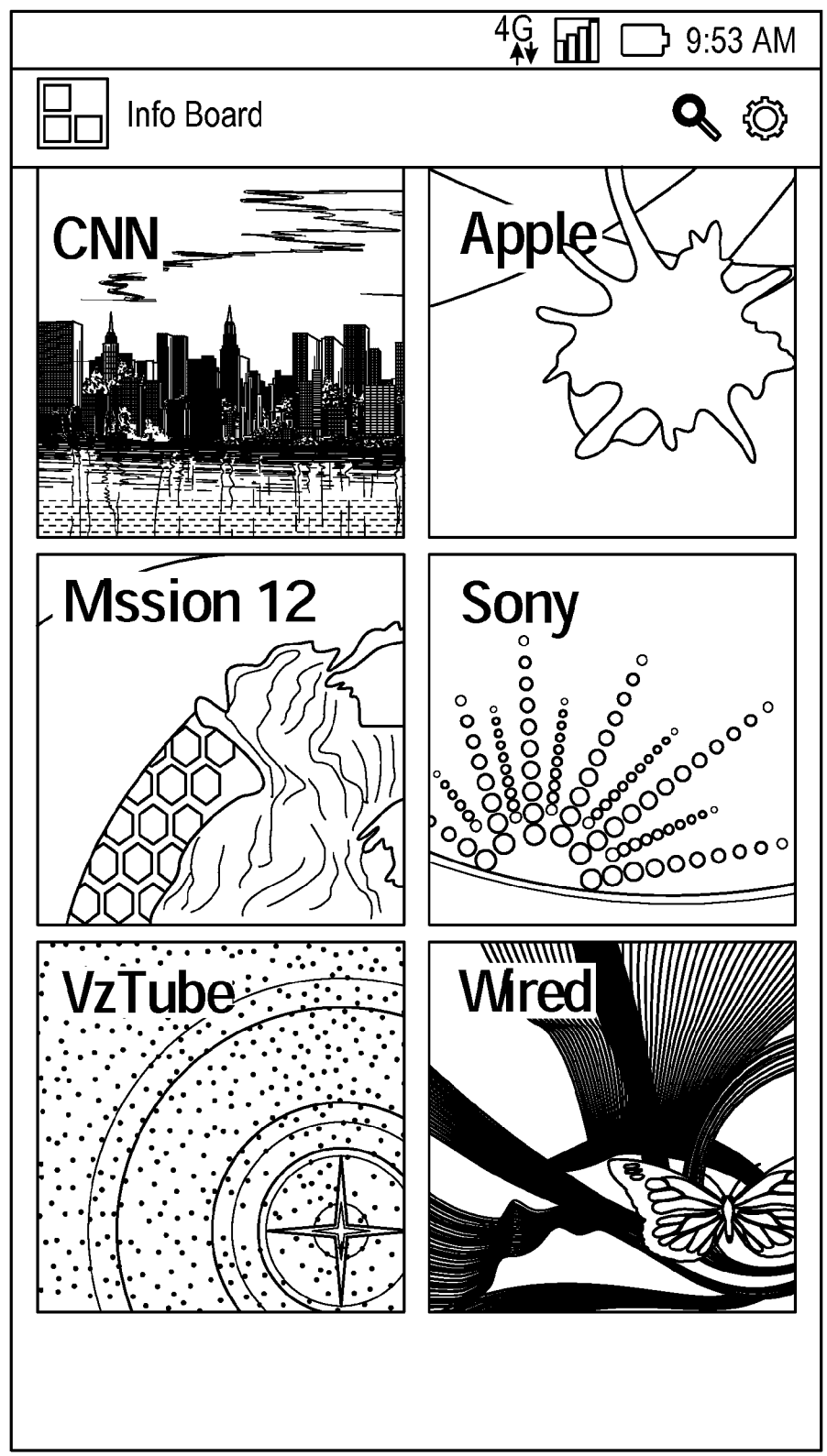

The interface of FIG. 8B is similar to that of FIG. 8A. However, in FIG. 8B, the blob on the "Apple" icon is larger, indicating that the content item corresponding to the "Apple" icon is believed to be even more engaging, for example, due to a larger number of users' emotional responses indicating that the content item is engaging. In some cases, a correspondence may exist between a size of the emotional response (e.g., measured in number of feedback items expressing the emotional response) and the size of the associated icon (e.g., measured in pixels or centimeters). For example, the size of the icon may be proportional to the size of the emotional response or proportional to the square or square root of the size of the emotional response.

Figure 8C:
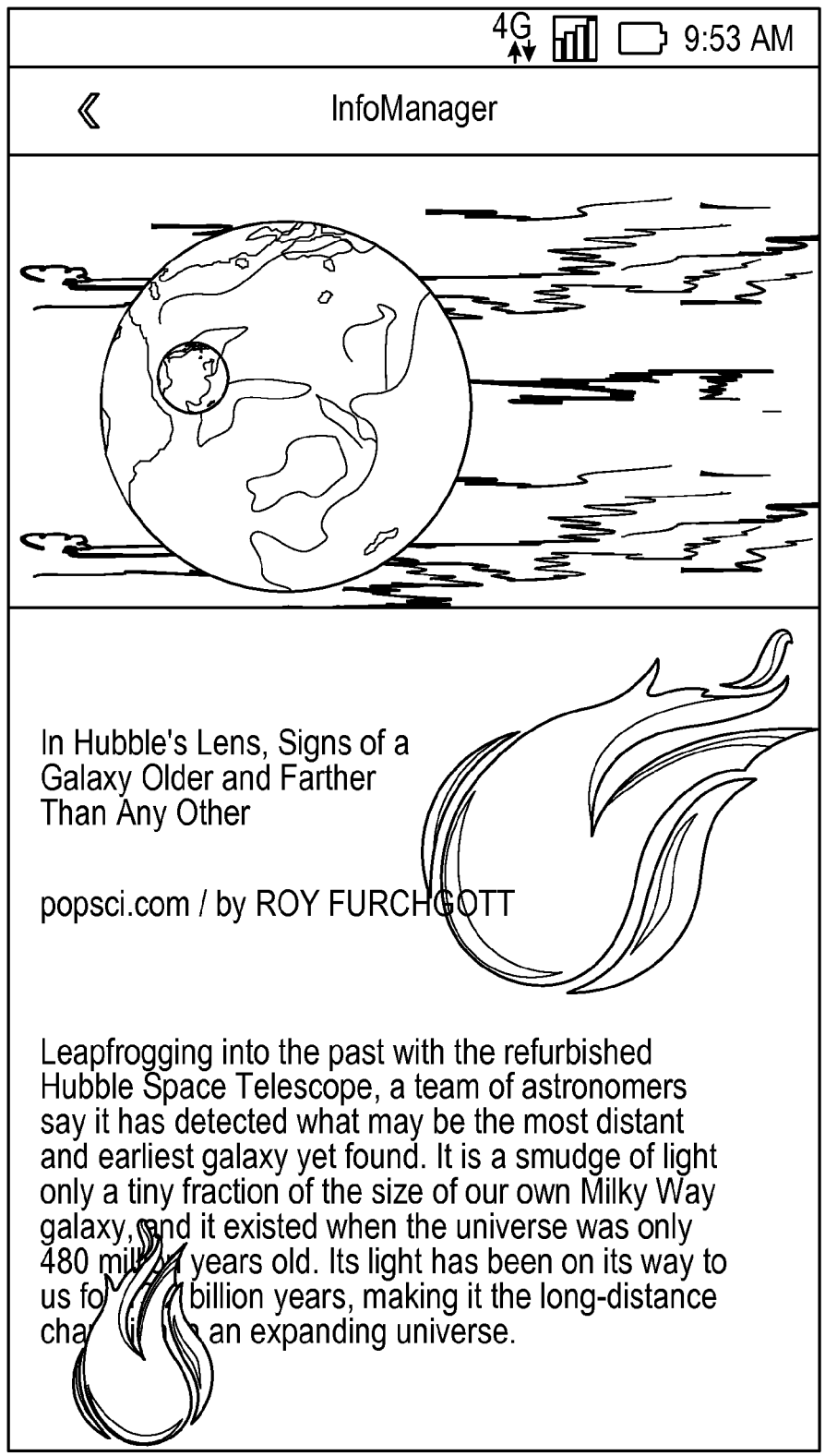

The interface of FIG. 8C illustrates an article. As shown, the article of FIG. 8C has fire icons, indicating that the community emotional response for the article is exciting. As explained herein, the community emotional response may be determined based on multiple users' emotional response, which may be determined based on user feedback items, for example, comments or social networking posts. As used herein, multiple icons (e.g., multiple fire icons), where the number of icons changes, and a single icon (e.g., a single blob icon) that changes size may be used interchangeably or one may be used in place of the other.

Figure 8D:
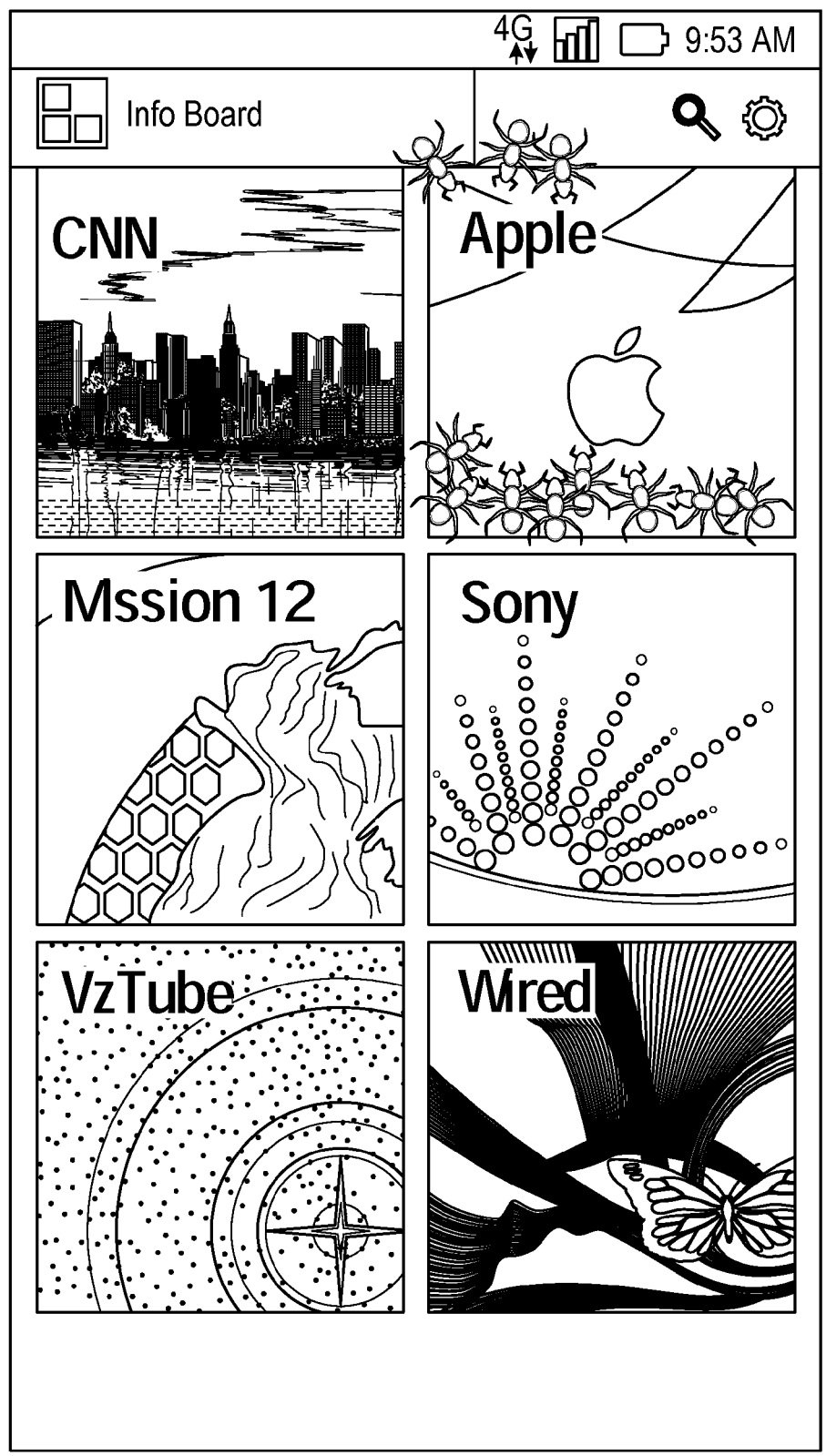

The interface of FIG. 8D is similar to that of FIGS. 8A and 8B. However, in FIG. 8D, the "Apple" icon has multiple ants, indicating that the content item associated with the "Apple" icon is popular or accessed by multiple users. Popularity may relate to emotions, to the degree that users are more likely to view happy or pleasing content. However, in some cases, content may be popular but not happy. For example, a newspaper article about a tragedy may be popular but not happy. As shown in FIGS. 8A, 8B, and 8D, the community response for a content item (e.g., the content item associated with the "Apple" icon) may change over time, for example, as additional user feedback items on the content item are received and analyzed by the server.

Figure 8E:

The interface of FIG. 8E includes icons for content items associated with "Cover Stories," "InfoManager" and "VZWeb." As shown, the "InfoManager" icon has an eye, indicating that the "InfoManager" icon is informative. The first time the eye is presented to the user, a pop-up window may be provided to indicate to the user that they eye is not part of the display and that the eye indicates informativeness of the "InfoManager." The "VZWeb" icon has footprints, indicating that the "VZWeb" icon is frequently accessed. The "Cover Stories" icon lacks an indicator of additional information and lacks an indicator of a community emotional response, as no additional information and no community emotional response may be available for the content item associated with the "Cover Stories" icon.

Figure 8F:

The interface of FIG. 8F includes headlines and blurbs for articles: "OfficeMax, Office Depot in Merger Talks," "Hugo Chavez Returns to Venezuela," and "Nebraska Senator Won't Seek Second Term." The article "OfficeMax, Office Depot in Merger Talks" has tears, indicating that the community emotional response for the article "OfficeMax, Office Depot in Merger Talks" is sadness. The other two articles, "Hugo Chavez Returns to Venezuela" and "Nebraska Senator Won't Seek Second Term," lack indicators of community emotional response, for example, because no community emotional response for the articles has been determined or is available. As illustrated in FIGS. 8A-8F, the button or background of an icon for a content item or of a content items itself may be changed depending upon a number of visitors, a sensitivity, and/or a community emotional response for the content item. A button may be changed, for example, by changing a color or a texture pattern (e.g., having a solid color, having dots, or having diagonal lines) of the button.

Some implementations of the subject technology are described above. However, other implementations are also possible. For example, a server or a client computing device can modify a webpage to only show features or content having a certain popularity or emotional response. For example, only popular and happy links may be provided. In some cases, emotional or popularity characteristics of a content item are displayed if certain thresholds are reached. For example, emotional or popularity characteristics may be presented if at least 100 or 1000 people have indicated any type of emotion associated with a content item or 50 or 500 people have indicated a strong emotion associated with the content item. The thresholds may be set by the server and/or by the client computing device via a user interface (e.g., a settings interface of a mobile device or web browser) at the client computing device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that the general structure and general operation of such equipment as shown in FIGS. 9 and 10 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 10). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a server and from a client computing device, a plurality of user feedback items for a first online content, wherein the plurality of user feedback items describe reactions of users to the first online content and include first and second user feedback items;
determining, at the server, a user emotional response associated with each of the plurality of user feedback items, each of the user emotional responses being associated with at least one of: a plurality of emotions or an intensity level of an emotion, wherein the determining the user emotional response associated with each of the plurality of user feedback items includes determining a first emotion is associated with a first user emotional response associated with the first user feedback item and determining a second emotion, different from the first emotion, is associated with a second user emotional response associated with the second user feedback item;
aggregating, at the server, the user emotional responses to determine a community emotional response to the first online content, the community emotional response being determined based on (i) the at least one of: the plurality of emotions or the intensity level of the emotion associated with the user emotional responses, and (ii) an emotion graph representing intensities and combinations of emotions, wherein the determining the community emotional response includes combining the first emotion associated with the first user emotional response and the second emotion associated with the second user emotional response into a resulting single third emotion according to the combinations of emotions represented by the emotion graph, the third emotion is different from the first and second emotions, and the third emotion is neither a stronger form of the first emotion nor a weaker form of the first emotion according to the intensities of emotions represented by the emotion graph; and
transmitting, from the server, a signal for displaying, on a display unit and in association with the first online content, a visual indication of the determined community emotional response to the first online content, wherein:
the visual indication of the community emotional response to the online content includes an icon placed over the online content,
a size of the icon corresponds to a size of the community emotional response,
the display unit including the plurality of online content provides access to a legend for enabling, disabling, or modifying the icon representing the visual indication of the community emotional response, and
the receiving the plurality of user feedback items includes, for each user feedback, steps of: receiving, at the server and from the client computing device, a user selection of an emotional response to the first online content, wherein the emotional response is selected from a set of emotional response options displayed on the client computing device; receiving, at the server and from the client computing device, an indication of an intensity level of the user selected emotional response; and storing the user selected emotional response and the intensity level.

2. The method of claim 1, wherein the determining the community emotional response is based on a most common emotional response among the aggregated user emotional responses.

3. The method of claim 1, wherein the determining the community emotional response includes:
   determining different emotional responses among the aggregated user emotional responses, in response to each of the different emotional responses being associated with at least a threshold number or percent of the user feedback items: and
   generating the community emotional response based on a combination of the different emotional responses.

4. The method of claim 1, wherein the plurality of user feedback items includes different user feedback items from different types of sources regarding the first online content.

5. The method of claim 4, wherein the determining the user emotional response associated with each of the plurality of user feedback items is based on comments or social networking posts displayed in a comment section of the first online content.

6. The method of claim 1, wherein the community emotional response is determined based on aggregation of multiple user selected emotional responses and multiple associated intensity levels.

7. The method of claim 1, further comprising:
   determining, based on the plurality of user feedback items, a popularity level for the first online content; and
   transmitting a signal for displaying, on the display unit and in association with the first online content, a visual indication of the popularity level for the first online content.

8. A non-transitory computer-readable medium comprising instructions to:
   receive a plurality of user feedback items for an online content, wherein the plurality of user feedback items describe reactions of users to the online content and include first and second user feedback items;
   determine a user emotional response associated with each of the plurality of user feedback items, each of the user emotional responses being associated with at least one of: a plurality of emotions or an intensity level of an emotion, wherein the determining of the user emotional response associated with each of the plurality of user feedback items includes determining a first emotion is associated with a first user emotional response associated with the first user feedback item and determining a second emotion, different from the first emotion, is associated with a second user emotional response associated with the second user feedback item;
   aggregate the user emotional responses to determine a community emotional response to the online content, the community emotional response being determined based on (i) the at least one of: the plurality of emotions or the intensity level of the emotion associated with the user emotional responses, and (ii) an emotion graph representing intensities and combinations of emotions, wherein the determining the community emotional response includes combining the first emotion associated with the first user emotional response and the second emotion associated with the second user emotional response into a resulting single third emotion according to the combinations of emotions represented by the emotion graph, the third emotion is different from the first and second emotions, and the third emotion is neither a stronger form of the first emotion nor a weaker form of the first emotion according to the intensities of emotions represented by the emotion graph; and
   transmitting a signal for displaying, on a display unit and in association with the online content, a visual indication of the determined community emotional response to the online content, wherein:
   the visual indication of the community emotional response to the online content includes an icon placed over the online content,
   a size of the icon corresponds to a size of the community emotional response,
   the display unit including the plurality of online content provides access to a legend for enabling, disabling, or modifying the icon representing the visual indication of the community emotional response, and
   the instructions to receive the plurality of user feedback items includes, for each user feedback, instructions to: receive, from a client computing device, a user selection of an emotional response to the online content, wherein the emotional response is selected from a set of emotional response options displayed on the client computing; receive, from the client computing device, an indication of an intensity level of the user selected emotional response; and store, at a memory, the user selected emotional response and the intensity level.

9. The computer-readable medium of claim 8, wherein the instructions to determine the community emotional response include instructions to identify a most common emotional response among the aggregated user emotional responses.

10. The computer-readable medium of claim 8, wherein the instructions to determine the community emotional response include instructions to:
    determine different emotional responses among the aggregated user emotional responses, in response to each of the different emotional responses being associated with at least a threshold number or percent of the user feedback items; and
    generate the community emotional response based on a combination of the different emotional responses.

11. The computer-readable medium of claim 8, wherein the plurality of user feedback items includes different user feedback items from different types of sources regarding the online content.

12. The computer-readable medium of claim 11, wherein the instructions to determine the user emotional response associated with each of the plurality of user feedback items include instructions to determine the user emotional response based on comments or social networking posts displayed in a comment section of the online content.

13. The computer-readable medium of claim 8, wherein the community emotional response is determined based on aggregation of multiple user selected emotional responses and multiple associated intensity levels.

14. A system comprising:
    one or more processors; and
    a memory comprising instructions which, when executed by the one or more processors, cause the one or more processors to:
    receive a plurality of user feedback items for an online content, wherein the plurality of user feedback items describe reactions of users to the online content and include first and second user feedback items;
    determine a user emotional response associated with each of the plurality of user feedback items, each of the user emotional responses being associated with at least one of: a plurality of emotions or an intensity level of an emotion, wherein the determining of the user emotional response associated with each of the plurality of user feedback items includes determining a first emotion is associated with a first user emotional response associated with the first user feedback item and determining a second emotion, different from the first emotion, is associated with a second user emotional response associated with the second user feedback item;

aggregate the user emotional responses to determine a community emotional response to the online content, the community emotional response being determined based on (i) the at least one of: the plurality of emotions or the intensity level of the emotion associated with the user emotional responses, and (ii) an emotion graph representing intensities and combinations of emotions, wherein the determining the community emotional response includes combining the first emotion associated with the first user emotional response and the second emotion associated with the second user emotional response into a resulting single third emotion according to the combinations of emotions represented by the emotion graph, the third emotion is different from the first and second emotions, and the third emotion is neither a stronger form of the first emotion nor a weaker form of the first emotion according to the intensities of emotions represented by the emotion graph; and transmit a signal for displaying, on a display unit and in association with the online content, a visual indication of the determined community emotional response to the online content, wherein:

the visual indication of the community emotional response to the online content includes an icon placed over the online content, a size of the icon corresponds to a size of the community emotional response, the display unit including the plurality of online content provides access to a legend for enabling, disabling, or modifying the icon representing the visual indication of the community emotional response, and to receive the plurality of user feedback items the memory further stores instructions which, when executed by the one or more processors, cause the one or more processors to receive, from a client computing device, a user selection of an emotional response to the online content, wherein the emotional response is selected from a set of emotional response options displayed on the client computing device; receive, from the client computing device, an indication of an intensity level of the user selected emotional response; and store, at a memory, the user selected emotional response and the intensity level.

15. The system of claim 14, wherein the instructions to determine the community emotional response include instructions to identify a most common emotional response among the aggregated user emotional responses.

16. The system of claim 14, wherein the instructions to determine the community emotional response include instructions to:
determine different emotional responses among the aggregated user emotional responses, in response to each of the different emotional responses being associated with at least a threshold number or percent of the user feedback items; and
generate the community emotional response based on a combination of the different emotional responses.

17. The method of claim 1, wherein the determining the community emotional response includes:
determining the first emotion is associated with at least a threshold number or percent of the user emotional responses;
determining the second emotion is associated with at least the threshold number or percent of the user emotional responses; and
determining the third emotion is the community emotional response in response to the determination that the first emotion is associated with at least the threshold number or proportion of the user emotional responses and the determination that the second emotion is associated with at least the threshold number or proportion of the user emotional responses.

18. The method of claim 1, wherein the determining the community emotional response includes increasing a weighting applied to a third user emotional response associated with a third user feedback item generated by a first user in response to the first user being a social networking contact of a user of the display unit.

19. The method of claim 1, wherein the determining the community emotional response includes increasing a weighting applied to a third user emotional response associated with a third user feedback item generated by a first user in response to the first user having similar viewpoints as a user of the display unit.

20. The method of claim 1, further comprising:
transmitting a signal for displaying the first online content in response to determining the first online content has a first community emotional response;
determining a second online content does not have the first community emotional response;
determining not to transmit a signal for displaying the second online content on the display unit in response to the determination that the second online content does not have the first community emotional response.

* * * * *